April 19, 1960 P. J. THUT ET AL 2,933,038

CODE RECORDING APPARATUS

Filed Dec. 29, 1955 6 Sheets-Sheet 1

INVENTORS.
PAUL J. THUT
ROBERT W. BEACHNER
BY
Benjamin J. Barish
ATTORNEY

INVENTORS
PAUL J. THUT
ROBERT W. BEACHNER
BY
Benjamin J. Barish
ATTORNEY

CODE RECORDING APPARATUS

Filed Dec. 29, 1955 6 Sheets-Sheet 3

INVENTORS
PAUL J. THUT
ROBERT W. BEACHNER
BY
Benjamin J. Barish
ATTORNEY

CODE RECORDING APPARATUS

Filed Dec. 29, 1955 6 Sheets-Sheet 4

INVENTORS.
PAUL J. THUT
ROBERT W. BEACHNER
BY Benjamin J. Barish
ATTORNEY

INVENTORS.
PAUL J. THUT
ROBERT W. BEACHNER
BY
Benjamin J. Barish
ATTORNEY

INVENTORS.
PAUL J. THUT
ROBERT W. BEACHNER
BY
Benjamin J. Barish
ATTORNEY

United States Patent Office 2,933,038

Patented Apr. 19, 1960

2,933,038

CODE RECORDING APPARATUS

Paul J. Thut, Penfield, and Robert W. Beachner, Rochester, N.Y., assignors, by mesne assignments, to Burroughs Corporation, Detroit, Mich., a corporation of Michigan Application December 29, 1955, Serial No. 556,360

8 Claims. (Cl. 101—91)

This invention relates to code recording apparatus and in particular to such apparatus for recording impressions on a record member at differential positions thereon to represent and store data which can be conveniently sensed by automatic "reading" equipment.

Data-representing record impressions have heretofore been more commonly applied in the form of perforations in the record member, although printed impressions, such as opaque and conductive ink markings, have also been used. In certain applications, however, such as recording coded information on bank checks, it is desirable that the coded information not include visible markings or perforations since they may be confused with check cancellation designations or with other information appearing on the check. The code recording apparatus of the present invention is particularly useful for recording the data-representing impressions on the record member in the form of discrete markings, or spots, of fluorescent material which is normally invisible but which has the property of fluorescence under the influence of, e.g., ultra violet light. While the invention is eminently suitable for recording fluorescent code markings, it will be appreciated as the description proceeds that it can also be incorporated in code recording apparatus for applying visible impressions, such as visible markings or perforations.

It is, therefore, an object of the invention to provide novel code recording apparatus particularly useful for applying data-representing record impressions to a record member in the form of normally invisible fluorescent markings.

Another object of the invention is to provide code recording apparatus having differentially settable recording elements on a rotary member for applying data-representing impressions to a record member in accordance with the differentially set positions of the recording elements.

A further object is to provide apparatus of the character in the preceding paragraph which also includes differentially fixed recording elements for applying further data-representing impressions to the record member.

A still further object is to provide apparatus of the foregoing character that may be continuously fed with a batch of record members and which is precisely controlled to assure that the record impressions will be applied to the individual record members in their proper differential positions with respect to a reference on the record member.

A still further object of the invention is to provide an ink fountain for code printing apparatus which is a self-contained and easily removable unit and which applies a fine and uniform coating of ink to the printing elements during each cycle of operation of the apparatus.

These and still further objects and advantages of the invention will be apparent from the following description of a preferred embodiment, it being understood that this embodiment is illustrative only and that the invention is susceptible of many modifications and applications in other recording devices.

In general, the described recording apparatus incorporating the invention comprises a rotary cylindrical member and a plurality of recording, or printing, elements settable to differential positions along the circumference of the rotary member in accordance with the data to be recorded. The apparatus feeds record members, such as bank checks, into recording position with respect to the rotary member whereby, when the latter is rotated, the recording elements apply impressions to the checks in differential positions thereon corresponding to the differentially set positions of the recording elements.

The apparatus described applies the record impressions in the form of discrete markings, or spots, of a fluorescent ink composition which is colorless and normally invisible but which is rendered visible or detectable by automatic "reading" equipment when subjected to, e.g., ultra violet light. The ink composition utilized can be one incorporating finely dispersed fluorescent pigments, such as zinc or zinc-cadmium sulfides, in a carrier or binder. The ink composition, being colorless, is essentially invisible under artificial light or daylight so as not to obscure any printed material on the check, and has the further property of enabling visible penned or printed marks to be applied thereover. Each of the fluorescent markings or spots, however, applied by the recording elements of the described apparatus is about 0.125 inch square, which is almost ten times larger than what is actually required to be detected by the "reading" equipment. Accordingly, any superimposed visible markings or perforations would not be likely to remove a whole spot or enough of one to produce an erroneous "reading."

The code markings in the embodiment disclosed represent data which is the same for all checks in a batch but which it may be desirable to change for different batches. An illustration of this type of data is the account number of a bank customer to be impressed by the bank on a supply of blank checks so that it appears on all the checks written by that customer. However, it may also be desirable to apply further data which is relatively constant for all batches of checks coded by the particular apparatus, such as the bank number and routing symbols applicable to the particular bank coding the checks. For that purpose, the described apparatus includes an additional group of recording elements which are fixed in differential positions along the circumference of the rotary member to apply this further, relatively constant data.

The apparatus includes manual means for locking and unlocking the settable elements to permit changing their settings. In the event the rotary member is inadvertently cycled with the above means in an unlocked condition, additional means are provided for locking the above means.

The recording elements are differentially positioned along the circumference of the rotary member with respect to an index point thereon. In the disclosed apparatus, this index point is a sheet gripping surface provided on the circumference of the rotary member. This index point bears a predetermined relationship with respect to a reference on the record sheet at the beginning of the recording action to assure that the recod impressions will be made on the record sheet in their precise differential positions with respect to the reference. In the disclosed apparatus, this reference on the record sheet is taken as the leading edge thereof which would be at a predetermined distance from the leading edge of the sheet gripping surface when engaging the sheet at the start of the recording action. The leading edge of the record sheet would thereby also serve as the reference for subsequently reading the information therefrom.

The described apparatus is continuously fed with a batch of record sheets or checks. As each record sheet moves into recording position with respect to the rotary recording member, a clutch, controlled by a roller in the path of the record sheet movement, is tripped to initiate a cycle of operation of the rotary member. A stop, also in the path of movement of the record sheet, positions the leading edge of the latter so that it will be in the required predetermined distance from the sheet gripping surface when the check is engaged thereby at the beginning of the recording part of the cycle.

Where the recording apparatus of the invention is to apply the record impressions in the form of printed fluorescent ink markings or spots, the apparatus as described includes an ink fountain for inking the recording elements during each cycle of operation of the rotary member. The known fluorescent ink compositions are frequently very viscous and difficult to spread evenly and uniformly on the recording elements. Moreover, it is necessary that only a minute amount of ink be transferred to the recording elements and that the ink transferred be evenly distributed thereover, so that the marks applied to the record sheets will dry very quickly. The described apparatus utilizes a self-contained, easily removable fountain which receives from the ink reservoir only a small amount of ink during each cycle of the recording apparatus and which thoroughly distributes the ink over a plurality of rolls before transferring it to the recording elements.

The recording apparatus hereinafter described as representing a preferred embodiment of the invention has been incorporated in apparatus generally similar to the printing apparatus illustrated in Patent No. 2,071,139, granted February 16, 1937, and assigned to the same assignee as the present invention. Certain details of construction disclosed in the above patent will be omitted from this description for simplification purposes and reference may be had to the above patent for a more complete description of such details.

*General construction*

As mentioned earlier, the invention as hereinafter described has been incorporated in apparatus similar in general construction to the printing apparatus shown in Patent No. 2,071,139. As an aid in understanding the present description, the elements generally similar to those described in the above patent will be correspondingly numbered throughout the following description, and the generally different or new elements will be numbered starting with "300." For a complete description of certain constructional details omitted from the present description, reference may be had to this patent.

Figure 1:
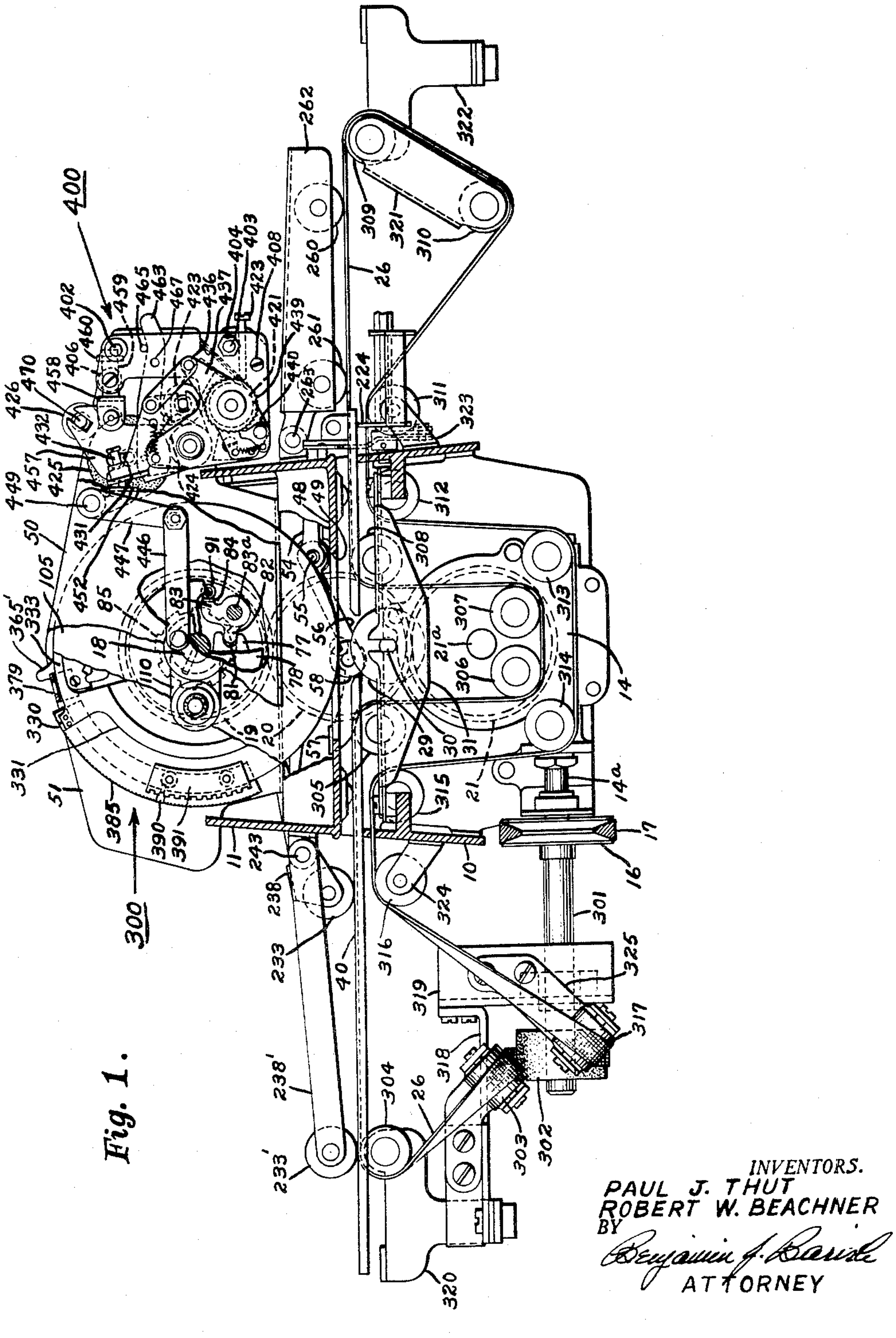
Fig. 1 is a side elevational view of the code recording apparatus constructed in accordance with the invention in which certain parts are removed and others broken away to more clearly show the internal structure.

Referring to Fig. 1, the described apparatus comprises a base or frame 10 having a casing 11 mounted thereon adapted to be enclosed by a cover (not shown). The means for driving the apparatus are supported on the base and comprise an electric motor and motor-pulley (not shown) and a pulley 16 driven from the motor-pulley through belt 17. Pulley 16 drives a worm shaft **14*a*, extending into worm housing 14, which in turn drives a shaft 21*a*. The latter shaft is secured to a gear 21 meshing with an intermediate gear 20 which in turn meshes with another gear 19. The latter gear drives the recording cylindrical member 300 coupled to a shaft 18 through the medium of a clutch mechanism which is engaged for each cycle of operation of the rotary member as will be explained below. Pulley 16 also drives another shaft 301 carrying a roller 302 at one end thereof which drives the record sheet, or check, feeding belt 26** as will be hereinafter described.

Figure 9:
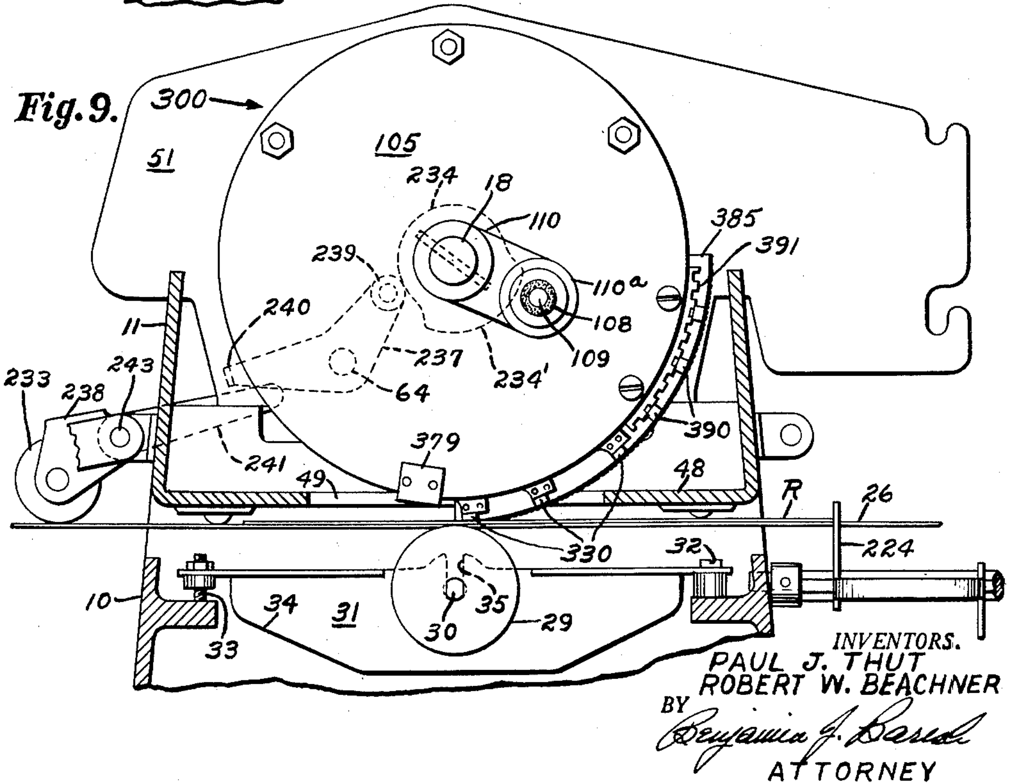
Fig. 9 illustrates the rotary member at the beginning of a recording action during its cycle of operation.

A platen roller 29 is supported beneath the rotary recording member 300 by a stud 30 on a supporting member 31 secured to the base 10 by means of a screw 32 and an adjustable stud 33 (see Fig. 9). The platen supporting member 31 includes oppositely disposed side portions 34 having slots 35 therein which receive the flattened ends of the stud 30 whereby the latter is prevented from rotating.

The record sheets, such as checks, to be impressed with the coded information are designated R. The checks are continuously fed from the left side of the machine of Fig. 1 from a receptacle (not shown) onto the belt 26, from there into recording position between the roller platen 29 and the rotary recording member 300, and thenceforth into a discharge receptacle (not shown). The check feeding belt 26 is a single endless loop having a check-conveying portion on one side of the platen and another check-conveying portion on the other side of the platen. A pair of spaced guide members 40 (Fig. 1) straddling the above two portions of the belt 26 guide the check through the apparatus. The guide members may be supported and independently adjusted for different size checks by any suitable means such as for example shown in Patent No. 2,071,139.

The belt is driven by roller 302 and is guided by rollers 303 and 304 to the path of movement of the checks through the machine. From roller 304 the belt conveys the checks to the platen 29, the belt then dropping below the platen as guided by rollers 305, 306 and 307, and reappearing in the check path on the other side of the platen on roller 308. The belt then extends in the path of movement of the checks to end roller 309, and is finally returned by rollers 310—317 to the drive roller 302. The belt rollers may be supported by any suitable means from the frame or base 10 of the apparatus. In the described apparatus, bracket 318 secured to frame members 319 and 320 supports roller 303, bracket 321 secured to frame member 322 supports rollers 309 and 310, bracket 323 supports roller 311, bracket 324 supports roller 316, and bracket 325 secured to frame 319 supports roller 317. The remaining belt rollers may be supported directly by the base or frame 10 by any suitable means.

The casing 11 of the apparatus is provided with a bottom wall 48 having an opening 49 therein, the side walls of the casing being connected by transverse plate members 50 and 51 fastened to the bottom wall by their respective securing flanges. An additional plate member 52 is secured to the casing adjacent one end thereof. (See Fig. 11.) The plate members 50—52 are provided with bearings 18′ in which the shaft 18 is mounted for rotation by gear 19 through the clutch mechanism to be described.

*Cyclic control of recording cylinder*

The disclosed apparatus provides means for driving the rotary recording cylinder 300 through cycles of operation, and further means for initiating a cycle of operation at the proper time. The latter means is controlled by the movement of a check into recording position which is sensed by a roller disposed in the path of the check movement to control the clutch which couples the recording cylinder to its drive.

Fig. 1 illustrates the means for sensing the movement of the check into recording position and the power clutch mechanism controlled thereby for cycling the rotary recording member 300, this mechanism being similar to that disclosed in the aforementioned Patent No. 2,071,139.

Secured on the bottom wall 48 of the casing are a pair of brackets 54 in which the opposite ends of a rod 55 are journaled. The rod has an arm 56 secured thereon, the arm having an offset portion 57 at its free end which normally rests on the bottom wall of the casing. Arm 56 is provided intermediate its ends with a roller 58. As the check is advanced through the machine by the belt 26, it will pass under roller 58 thereby lifting arm 56. Roller 58 and its arm 56 thereby serve to detect the movement of the check into recording position. As arm 56 is lifted by the check, it rocks rod 55 which, through further mechanism shown in Patent No. 2,071,139 and briefly described below, trips a clutch stop arm 77 to couple a clutch disk 78, pinned on the driven shaft 18, with the continuously running drive gear 19.

The clutch stop arm 77 is carried on the clutch disk 78 and has a notch 81 engaged by a projection 82 of a clutch dog 83 which is also carried on the disk 78 by the stud 83*a*. The clutch dog 83 is provided with a lug 84 which is adapted to engage the teeth of a constantly rotating driving member 85 driven by the gear 19, this member being loosely mounted on shaft 18. Clutch stop arm 77 is normally tensioned to the position shown in Fig. 1 whereby the lug 84 of the clutch dog 83 is held out of engagement with the teeth of the driving member 85. When the mechanism is tripped by the lifting of arm 56 as a check passes thereunder, in a manner described in Patent No. 2,071,139, arm 77 is pivoted to rock the clutch dog 83 to bring its lug 84 into the path of the teeth of the continuously rotating drive member 85. As lug 84 engages the teeth of the drive member 85, it forms through the disk 78 on which it is carried a drive connection between the motor driven power means including gear 19 and the driven shaft 18.

The clutch mechanism completes a cycle of rotation, whereupon clutch dog 83 is disengaged from the drive member 85 thereby disconnecting therefrom the driven shaft 18, as described in the aforementioned patent.

It will be appreciated that the present invention does not depend on the construction of this particular clutch mechanism and therefore it is not completely described herein, reference being made to the above patent for a more detailed description.

*Recording cylinder and settable recording elements*

Figures 2, 10:
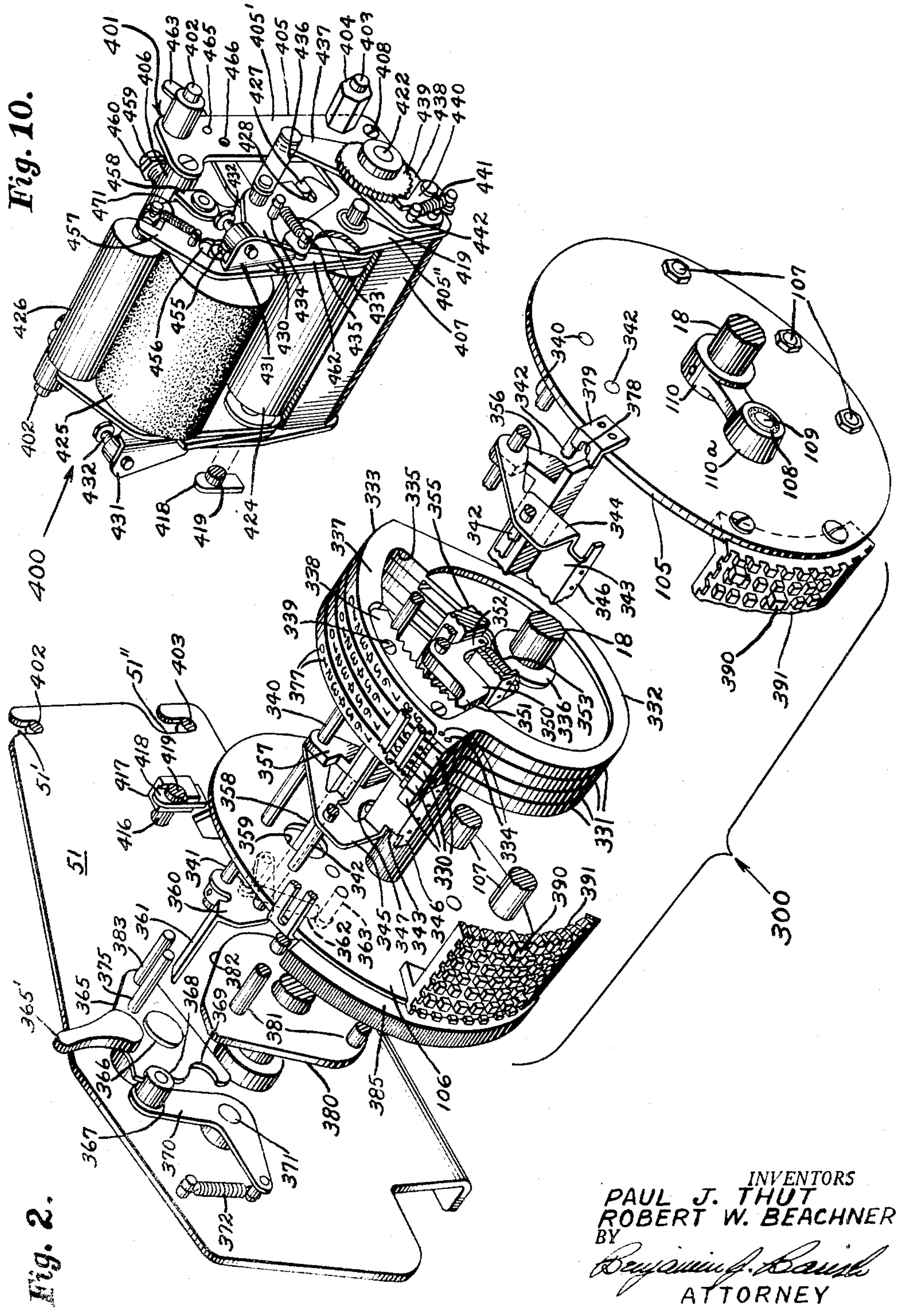
Fig. 2 is an exploded perspective view of the rotary member and its recording elements utilized in the code recording apparatus of Fig. 1.
Fig. 10 is a perspective view of the ink fountain.

The rotary recording cylinder 300 driven by shaft 18 is shown in Fig. 2. As previously mentioned, the rotary member 300 carries the recording elements which are differentially positioned along its circumference for applying the data-representing impressions on the record sheets or checks R.

The rotary recording cylinder 300, comprising a pair of circular end plates 105 and 106 connected by three cross rods 107, is loosely mounted on shaft 18 between the frame plates 50 and 51 of the casing 11. A coupling member 110 fixed to shaft 18 has an extension thereof 110*a* fixed to end plate 105 of the recording cylinder by means of a stud 109 passing therethrough and secured in the end plate. An insert 108 of shock absorbing material cushions this coupling between stud 109 and the extension 110*a*. The rotary motion from shaft 18 is thereby transmitted by member 110 to the recording member 300.

Figure 14:
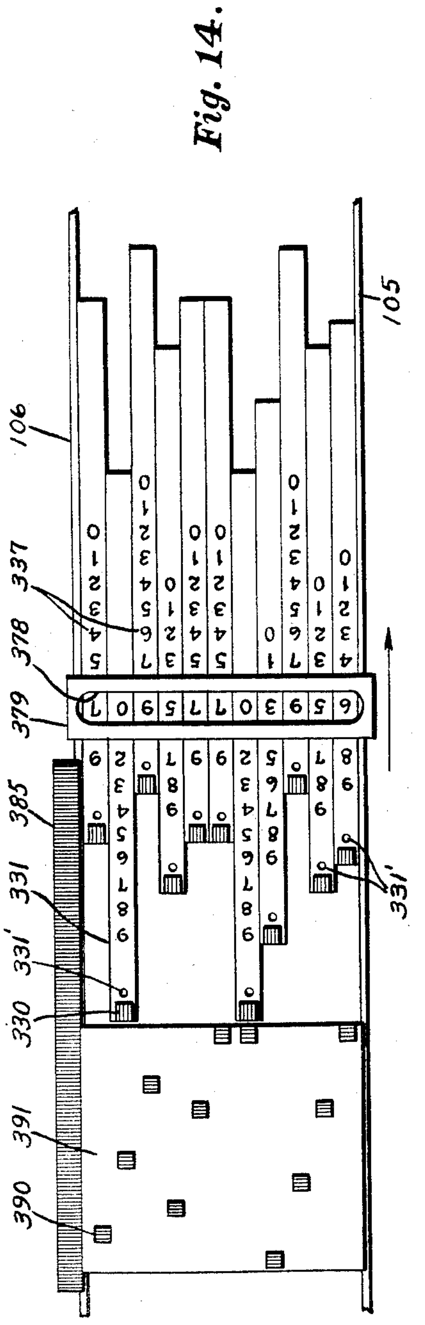
Fig. 14 is an expanded diagrammatic view of the rotary recording member illustrating the sheet gripping means and the differentially positioned recording elements.

The recording elements of the cylinder 300 are in the form of metal blocks 330, each of which is fixed to a settable circular disk, or ring, 331 freely mounted on shaft 18 between end plates 105 and 106 of the cylinder. In the embodiment described, there are eleven such recording elements and settable disks, the disks substantially filling the space between the end plates 105 and 106, as shown in Fig. 14.

Each of the settable disks 331 comprises a section 332 of a radius smaller than that of end plates 105 and 106 to provide space for the cross rods 107, and another section 333 of a radius substantially equalling that of the end plates. The recording element 330 of each settable disk is secured by fasteners 334 to a projecting end of the latter section so that it can be considered on the circumference of the rotary cylinder 300.

The settable disks 331 are freely mounted on shaft 18 so that they, and the recording elements 330 carried thereby, can be settable to differential positions along the circumference of the rotary cylinder 300. In the disclosed embodiment, the recording elements are settable to their differential positions by manual means, since the data to be represented thereby (e.g., the coded account number to be applied to a batch of checks) is not ordinarily to be changed for each machine cycle but is to be the same for a large number of machine cycles. It will be appreciated, however, that the apparatus disclosed is also susceptible for use with automatic means for setting the recording elements where the apparatus is to be used in applications requiring more frequent resetting.

To permit the setting of the recording elements 330 in their data-representing differential positions along the circumference of the rotary member 300, each of the disks 331 has a somewhat triangular shaped opening 335 intermediate its hub 336 and its rim 337 of its larger-radius section 333. The rim 337 in each disk contiguous to this opening is provided with a recess to accommodate an indexing segment 338, having a plurality of spacing teeth, secured therein by fasteners 339.

A shaft 340 passes through the space formed by openings 335 of all the disks and has one end thereof seated in an aperture in end plate 105 and its opposite end extending through an aperture in end plate 106 and terminating in extension 341. Another shaft 342 extends through openings 335 of the settable disks, parallel to shaft 340, and has its opposite ends seated in apertures in end plates 105 and 106. The two shafts 340 and 342 support a yoke member 343 by means of upstanding arms 344 and 345 at each end of the yoke member. The yoke member is formed with a depending flange 346 and an elongated slot 347 both extending for substantially its entire length between the two arms 344 and 345.

Each of the settable disks 331 is yieldingly retained in its set position by a pawl 350 for each disk pivotally mounted on shaft 342, each pawl having a retaining dog 351 cooperable with the teeth of its respective indexing segment 338. The pawls 350 are formed with depending arms 352 disposed in the elongated slot 347 of the yoke member, and their retaining dogs 351 are tensioned clockwise into engagement with the teeth of their respective indexing segments 338 by springs 353 each fastened at one end to the depending arm 352 of the pawl and at its other end to flange 346 of the yoke member. The foregoing elements thereby permit the setting of the disks 331 along the circumference of the rotary cylinder 300 and yieldingly retain the disks in their set positions.

Means are provided for locking and unlocking the disks 331 in their set positions, this means comprising a bail 355 cooperable with the depending arms 352 of all the pawls 350. The bail 355 is pivotally mounted on shaft 340 between end plates 105 and 106 by the bail arms 356 and 357 formed at opposite ends thereof. The bail is normally held in the locking position shown in Fig. 2 (also Fig. 4) by means of a stud 358 protruding through a clearance hole 359 in end plate 106 and seated in a retaining hole at the corresponding end of the bail. Stud 358 is fixed to a lever 360 carrying an arm 361, the lever being mounted on extension 341 of shaft 340. The lever 360 is tensioned clockwise (to the position shown in Figs. 2 and 3) by a spring 362 attached to a stud 363 on end plate 106.

Figures 3, 4, 5, 6, 7:
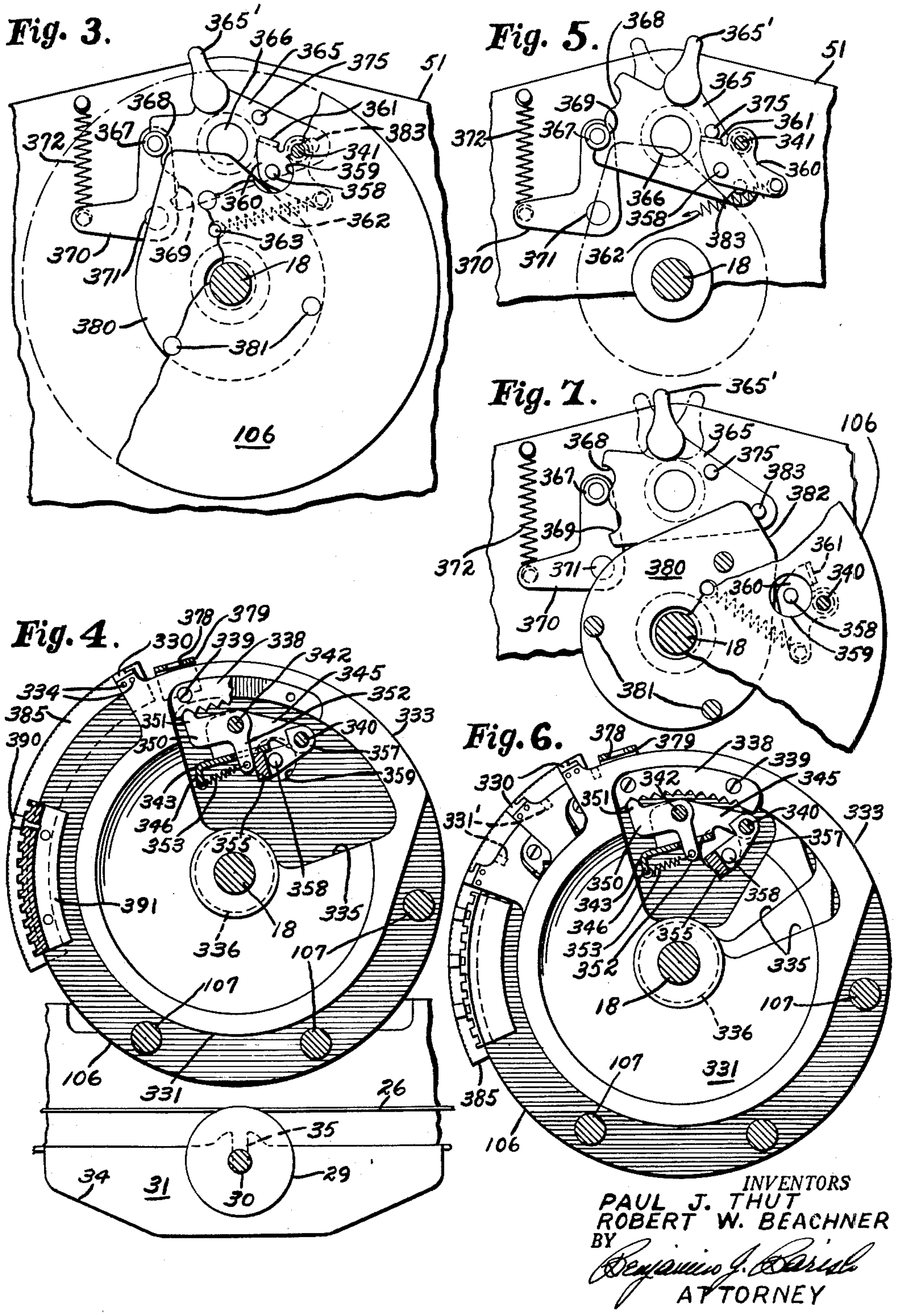
Fig. 3 is a side elevational view of the manual locking means for the settable elements, such means being shown in locking position.
Fig. 4 is a view of a settable recording element in locked position.
Fig. 5 is a view similar to Fig. 3 illustrating the manual locking means in unlocking position.
Fig. 6 is a view similar to Fig. 4 of a settable recording element in unlocked position to permit changing its setting.
Fig. 7 illustrates the manual locking means, in the event such means were inadvertently left unlocked, being automatically locked upon cycling of the rotary member.

The bail 355, when positioned as shown in Figs. 2 and 4, is supported in the path of movement of the depending arms 352 of all the pawls should the latter attempt to pivot counter-clockwise on shaft 342 to release their retaining dogs 351 from the teeth of their respective indexing segments 338. This would be the position of the bail during the cycling of the rotary recording member 300, as will be more fully described below, and it is thus seen that the bail, cooperating with the pawls 350 and indexing segments 338, thereby locks the disks 331 and their recording elements 330 in their differentially set positions.

To unlock the disks 331 in order to change the settings of the recording elements 330, the bail 355 is pivoted in a counter-clockwise direction on shaft 340. This is accomplished by manual means in the disclosed apparatus. As shown in Fig. 2, a lever 365, having a manually manipulatable extension 365′, is mounted on frame member 51 of the casing 11 by means of a stud 366. The lever is pivotable on the stud to a locking position, shown in Figs. 2 and 3, or to unlocking position shown in Fig. 5, and is yieldingly retained in either position by a roller 367 seatable in one of two semi-circular notches 368 and 369 formed therein. The roller 367 is carried by a pivotal member 370 mounted on frame plate 51 by stud 371 and tensioned clockwise into engagement with the notches 368 or 369 by a spring 372 fastened between this member and the frame plate.

The lever 365 carries a stud 375 in the path of arm 361 when the lever, in an unlocking operation, is rocked clockwise about its pivot. During this operation, stud 375 engages arm 361 and rocks the latter about its pivot 341, counter-clockwise against the tension of its spring 362. This causes stud 358 carried by lever 360 to also rock counter-clockwise moving therewith bail 355 to its unlocking position out of engagement with arms 352 of all the pawls 350.

Figs. 3 and 4 illustrate the foregoing elements in their locked positions and Figs. 5 and 6 illustrate them in their unlocked positions. As shown in Fig. 3, lever 365 is yieldingly retained in its locked position by roller 367 seated in notch 368 of the lever. In this position, stud 375 is not in contact with arm 361 whereby lever 360 assumes its clockwise position under the influence of spring 362. Stud 358, carried by lever 360 and seated in a retaining hole in the bail 355, thereby positions the bail in contact with arms 352 of all the pawls 350, as shown in Fig. 4. As the bail in this position blocks the pawls from a counter-clockwise movement about shaft 342, the retaining dogs 351 of the pawls are locked in engagement with the teeth of their respective indexing segments 338, thereby locking the settable disks 331 and their recording elements 330 in their differentially set positions.

To unlock the settable disks 331, the lever 365 is manually rocked clockwise by its extension 365′ to the position shown in Fig. 5 and is retained in this position by roller 367 seated in notch 369 of the lever. During this movement of the lever 365, its stud 375 engages arm 361 of lever 360 thereby rocking the latter counter-clockwise against the tension of its spring 362. This movement of lever 360 carried with it its stud 358, thereby pivoting the bail 355 on its shaft 340 to the positions shown in Fig. 6. This releases the bail from engagement with arms 352 of all the pawls 350, permitting the latter to yield (counterclockwise) as the settable disks 331 are reset to new differential positions along the circumference of the rotary recording cylinder 300. Once the settable disks are unlocked, they may be moved to their new positions by any suitable means such as manually with the aid of a tool having a hooked end adapted to enter aperture 331′ (Fig. 14) in the individual disks 331. The disks are provided with visible numbers 377 (Fig. 14) corresponding to the differentially set positions of their recording elements, the numbers being visible through a sight opening 378 in a plate 379 secured to end plates 105, 106.

The foregoing elements should, of course, be locked in their differential positions before the rotary recording member 300 is cycled. In the event this member is cycled with these elements inadvertently left in an unlocked condition, means are provided for automatically locking them at an early part in its cycle. For this purpose, a cam 380 is freely mounted on shaft 18 between frame plate 51 and circular end plate 106, and is fixed to the latter to rotate therewith by three studs 381. Cam 380 has a high point 382 which, at the early part of the rotary movement of cylinder 300, is adapted to contact another stud 383 carried on locking lever 365 (see Fig. 7) to rock the latter counter-clockwise to its locking position, thereby locking the elements in the manner described above.

The recording elements 330 are settable by the foregoing structure to differential positions along the circumference of the rotary cylinder 300 with respect to an index point on the rotary member. This index point in the disclosed apparatus is represented by a sheet gripping surface provided on the circumference of the rotary cylinder and is defined by the leading edge of this gripping surface. This surface is formed by a curved plate 385 having sheet gripping projections, produced by transverse grooves, fastened to end plate 106 of the recording member 300 along the circumference thereof.

These projections on plate 385 extend substantially the same distance from the axis of rotation of the cylinder as the recording elements 330 so that they will grip the record sheets and move them in the direction of rotation of the cylinder as the recording elements apply the record impressions to the checks. The index point on the rotary member, i.e., the leading edge of the sheet gripping plate 385, bears a predetermined relationship with respect to a reference on the check when engaged thereby at the beginning part of the cycle to assure that the code impressions applied by the recording elements 330 will be at their precise differential positions with respect to the reference on the check. This reference would thereby serve also as a reference in subsequent decoding of the coded information by the "reading" apparatus.

In the disclosed embodiment, the reference point on the check is taken as its leading edge as it is fed through the machine. This conveniently permits the utilization of the automatic stop means disclosed in the aforementioned Patent No. 2,071,139 for arresting the movement of the check at the precise position where its leading edge would bear the above predetermined relationship with the sheet gripping plate 385 when the latter first engages the check at the beginning of the recording part of the cycle.

*Automatic stop mechanism*

This stop means, as disclosed in the above patent, includes a stop element 224 positionable in the path of the record sheets R as they are fed through the machine by the conveyer belt 26. (See Figs. 1 and 9.) The stop element 224 is urged to its upper position (shown in Fig. 9) to arrest the movement of the check but is normally retained in its lower position out of the check path (as shown in Fig. 1) by mechanism described in the above patent. As the record sheet is fed into recording position between the rotary cylinder 300 and the platen 29, roller 58 (Fig. 1) is raised, as heretofore described, to release the stop element 224 into the check path thereby arresting the check from further movement by the belt. As shown in Fig. 9, the stop element thereby positions the check so that its leading edge bears the required predetermined relationship with respect to the leading edge of the sheet gripping plate 385 at the time it is first engaged thereby at the start of the recording part of the cycle. As the cycle of the rotary cylinder 300 continues, the sheet gripping plate 385 thereof grips the edge of the check and reverses its movement as the recording elements 330 apply the data-representing impressions on the check. This arrangement, including the stop element 224, assures that the record impressions applied to the check with its leading edge as a reference will correspond to the differentially set positions of the recording elements 330 with respect to the leading edge of the sheet gripping plate 385 taken as an index point.

The stop element 224 remains in its raised position until the sheet gripping plate 385 has engaged the check, and preferably until the latter part of the completed cycle of the rotary recording cylinder 300. It is then returned to its lowered position by the mechanism described in the above patent, to allow the check to be conveyed by the belt 26 from the recording position to the storage receptacle (not shown). The stop element may be made adjustable, as also described in the above patent, to fix the position of the leading edge of the check and to accommodate different size checks.

*Fixed recording elements*

As mentioned above, the code impressions applied by the differentially settable recording elements 330 may represent data which is the same for all the checks in a batch (i.e., the account number). The apparatus provides an additional group of recording elements to record further data which is relatively constant for all batches of checks coded by the particular apparatus, such as the bank number and routing symbol applicable to the particular bank coding the checks. These additional recording elements 390 are supported on a curved plate 391 extending between end plates 105 and 106 and secured thereto to rotate with the rotary cylinder 300. Curved plate 391 is formed with a plurality of longitudinal and transverse grooves defining differential positions for the recording elements 390 at the points of intersection of these grooves. The fixed recording elements 390 are each formed as a square block, shaped similarly to recording elements 330, and with a boss extension adapted to be fixed in apertures at the intersecting points of the grooves according to the required fixed differential positions. The recording elements 390 are equidistant as recording elements 330 and the sheet gripping plate 385 from the axis of rotation of cylinder 300 so that they are also on the circumference of the cylinder. In addition, the fixed recording elements 390 are positioned differentially with respect to the leading edge of the sheet gripping plate 385 to apply their record impressions to the check in their proper differential positions with respect to the leading edge of the check.

*Feeding and ejecting rollers*

The apparatus is provided with a pressure roller 233 which is normally in yielding contact with the feed belt 26 in order to retain the check R in contact with the belt as it is fed into recording position. As mentioned above, when the recording elements 330 and 390 and the sheet gripping plate 385 engage the check, the check is moved in a direction opposite to that in which it was previously fed by the belt 26. It is, therefore, desirable to raise the pressure roller 233 from contact with the check at the proper time so that the check may be free for this reverse movement to preclude buckling or improper displacement of the check through contact with the pressure roller. For this purpose, referring particularly to Fig. 9, a cam 234 is fixed to shaft 18 between plates 51 and 52 of casing 11 and is provided with a high portion 234' adapted to engage a roller 239 carried by a lever 237 pivotally mounted on a rod 64. Lever 237 has a lug 240 at its opposite end adapted to engage the inner end of an arm 241 to rock the latter downwardly about a stud 243 when the high point 234' of the cam engages roller 239. Pressure roller 233 is carried by member 238 integral with arm 241 and is thereby raised out of contact with the belt upon the downward movement of this arm.

Stud 243 also has pivotally mounted thereon a bracket 238' (Fig. 1) carrying another pressure roll 233' which is normally retained in engagement with the belt 26 by its own weight. The latter pressure roller 233' is not in contact with the check during the above reverse movement thereof, and, accordingly, need not be raised with pressure roller 233. However, roller 233' can be manually raised by lifting it about its pivot 243.

To insure ejection of the record sheet from the machine after the recording operation is completed, additional pressure rollers 260 and 261 are provided at the exit side of the disclosed apparatus (Fig. 1) and are normally retained in contact with the belt 26 under their own weight. These rollers are carried by a bracket 262 pivoted at 263 so that, if it is desired to withdraw the rollers from contact with the belt, bracket 262 may likewise be swung upwardly to an elevated position.

*Ink fountain*

In the disclosed apparatus as mentioned above, the recording elements 330 and 390 apply their record impressions to the record sheet in the form of printed fluorescent ink markings or spots. An ink fountain, generally designated as 400, applies a thin and uniform film of ink to these elements during each cycle of rotation of the recording cylinder 300.

The recording elements require only a small amount of ink during each cycle, and in fact it is necessary that the film of ink applied to these elements by the ink fountain be kept small so that the ink deposit on the record sheet will dry very quickly. Accordingly, the ink fountain is provided with a pickup roll which receives a small amount of ink from the ink reservoir and transfers only a minute amount to the distributor rolls during each cycle, which in turn transfers it to the inking roll. An oscillating arm is used as an aid in transferring this small amount of ink during each cycle from the ink reservoir to the pickup roll.

The distributor rolls and the inking roll are continuously driven while the recording apparatus is in use so that the ink received from the pickup roll will be maintained as a very thin and uniform film on these rolls. For each cycle of the recording cylinder, one of the distributing rolls is rocked into contact with the pickup roll to receive the ink therefrom. During this rocking movement, the pickup roll is indexed one increment of rotation to receive another small amount of ink from the ink supply with the aid of the oscillating member above mentioned. Another distributor roll is continuously reciprocated to evenly distribute the ink received from the pickup roll onto the surface of the inking roll, the latter transferring the ink to the recording elements.

Figure 11:
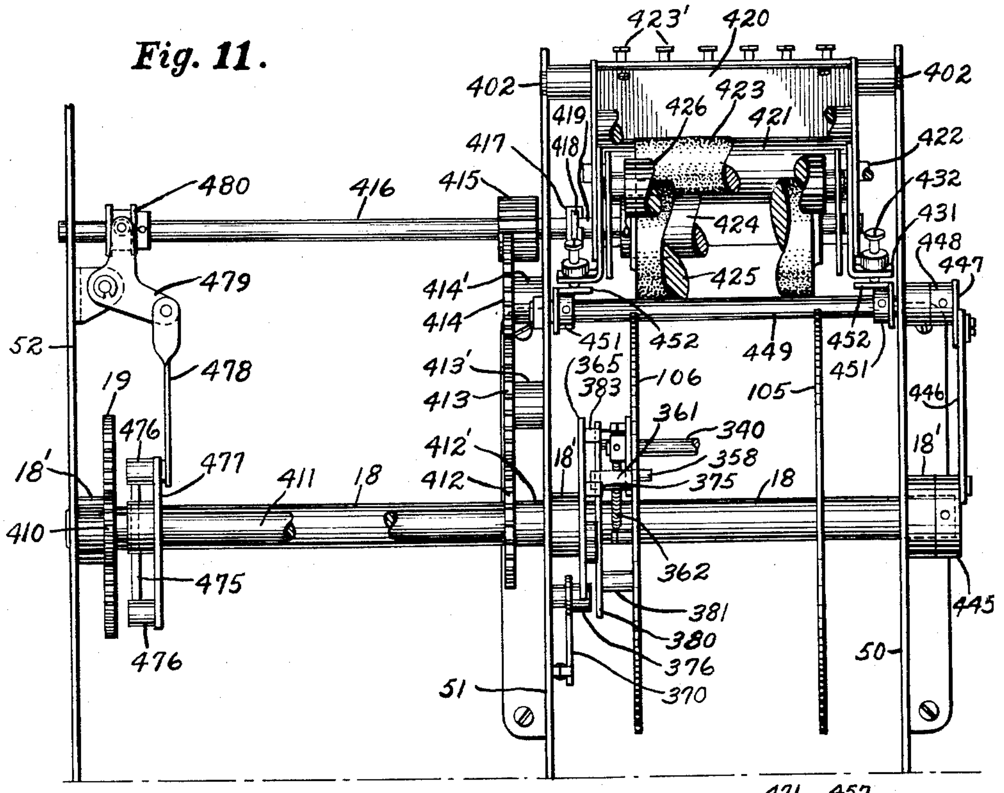
Fig. 11 is a top plan view of the ink fountain and the drive mechanism therefor.

As shown in Figs. 2, 10 and 11, the ink fountain 400 comprises a frame 401 supported from transverse plates 50 and 51 of the casing 11 by means of a pair of upper studs 402 projecting from the frame and adapted to be inserted in slot 51' of plate 51 and a corresponding slot in plate 50 (not shown), and a pair of lower studs 403 adjustable on the frame by nuts 404 and adapted to be inserted in slot 51" in plate 51 and a corresponding slot in plate 50. The frame consists of a pair of side members 405, each being similarly formed with a longer rear leg 405' interconnected by a cross rod 406, and a shorter front leg 405". The frame is closed at the bottom by a trough-shaped member 407 by means of a pair of fasteners 408 passing through side members 405 into apertures 409 (Fig. 8) in the trough. The mounting studs 402 and 403 are fixed to the longer rear legs 405' of the two side members. The foregoing mounting means enables the ink fountain to be quickly and conveniently mounted between plates 50 and 51 in position to ink the recording elements of the rotary cylinder 300.

Figures 12, 13:
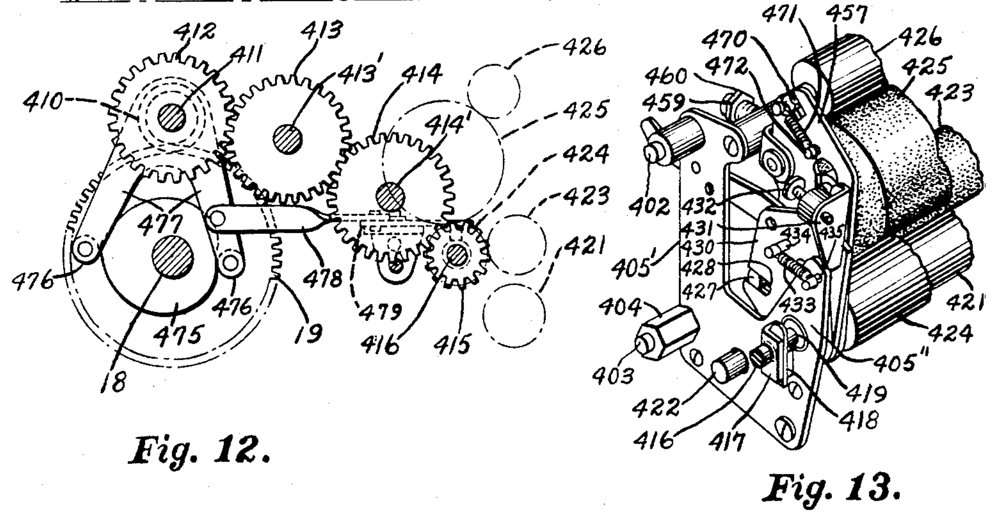
Fig. 12 is a diagrammatic view of the drive mechanism for the ink fountain, this figure also illustrating the five rolls thereof in broken lines in their normal positions with respect to each other.
Fig. 13 is a partial perspective view illustrating the side of the ink fountain connectable to its drive mechanism.

The drive for the ink fountain, shown in Figs. 11 and 12, is taken from gear 19 which also drives the recording cylinder 300 through the power clutch as described above. It will be recalled that gear 19 is powered by the electric motor through a pulley system and is continuously driven while the apparatus is in use. With respect to the ink fountain drive, gear 19 drives a smaller gear 410 fixed to shaft 411 journaled in transverse plates 51 and 52 of casing 11. Shaft 411 carries a gear 412 fixed thereon at its end adjacent to plate 51, which gear drives a gear train comprising gear 413 on stub shaft 413' in plate 51, gear 414 on stub shaft 414' in plate 51, and gear 415 fixed to shaft 416 extending from plate 52 through plate 51. The end of shaft 416 extending through plate 51 terminates in a U-shaped member 417 adapted to straddle an arm 418 fixed to shaft 419 (Figs. 11 and 13) of the ink fountain 400 thereby effecting a quickly detachable coupling between drive shaft 416 and shaft 419 of the ink fountain. It will thus be seen that shaft 419 can be quickly coupled to the drive means in the same simple operation of mounting the self-contained ink fountain between transverse plates 50 and 51, and that this shaft 419 will be continuously driven while the apparatus is in use.

The fluorescent ink supply I in the ink fountain (Fig. 8) is found in a reservoir defined by a metal blade 420 and the pickup roll 421. Blade 420 is secured to the trough-shaped member 407 and extends the full width of frame 401, and the pickup roll 421 is fixed on shaft 422 journaled through the side members 405 of the frame. The blade may be slightly spaced from, or pressed into light contact with, roll 421 by a plurality of adjustable screws 423' (Figs. 8 and 11) projecting through the rear of trough 407 to vary the thickness of the ink coating applied to this roll as it is rotated in a manner to be described. The ink is transferred from pickup roll 421 to a distributor roll 423, thenceforth to another distributor roll 424, and then to the inking roll 425 (Figs. 8 and 12), as will be later described. Inking roll 425 is positioned to be contacted by the recording elements 330 and 390 in the early part of the cycle of the rotary cylinder 300. A further distributor roll 426 rests on the upper surface of inking roll 425. Distributor roll 423 and inking roll 425 in the illustrated embodiment are of rubber-like material, whereas the remaining rolls 421, 424 and 426, are of steel.

Rolls 423—426 are constantly driven while the apparatus is in use, whereas pickup roll 421 in contact with the ink supply is not in motion except during cycling of the rotary member 300, at which time this roll is stepped one increment of rotational movement for each cycle. As shown particularly in Figs. 11–13, distributor roll 424 is fixed to power shaft 419 and therefore would be continuously rotated while the apparatus is in use, since this shaft is coupled to constantly rotating shaft 416. Roll 424 is normally in engagement with distributor roll 423 and inking roll 425, the latter also engaging distributor roll 426, so that these three rolls are also continuously driven while the apparatus is operating. Distributor roll 423, however, is spaced from pickup roll 421 when the former is in its normal position (see Fig. 12) so that the latter roll is not driven from roll 424 with the other rolls but rather is rotated one step during each rotary cycle of the recording cylinder 300 as will be described below.

Figure 8:
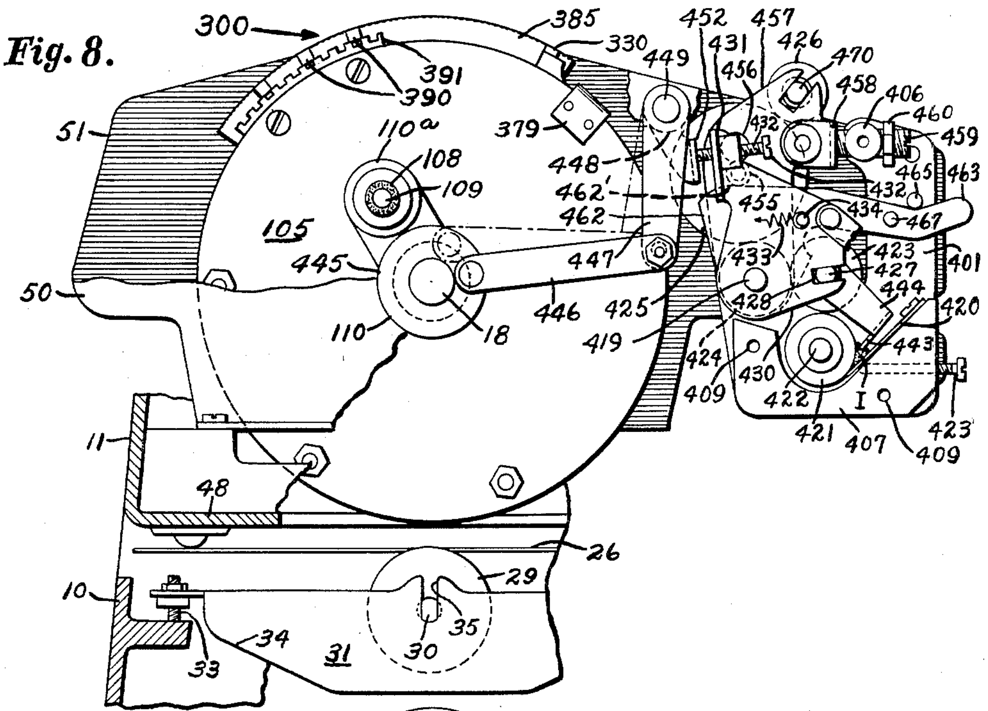
Fig. 8 illustrates the rotary member and the inking fountain for its recording elements at the early part of a cycle of operation of the rotary member.

As shown in Figs. 8, 10 and 13, distributor roll 423 is freely mounted on a shaft 427 flattened at its ends and seated in an open notch 428 in the two side members of a cradle 430. The cradle is formed with an ear 431 at the upper portion of each of its sides, each ear having an adjustable screw 432 passing through an aperture therein. The cradle 430 is pivotally mounted on power shaft 419 with respect to frame 401, and is urged to its normal position of Fig. 10 by a spring 433 at each side of the cradle engaging a stud 434 thereon and a stud 435 on the frame. The cradle 430 also carries a link 436 fixed to an arm 437 of a bell crank 438, the latter being pivoted about shaft 422 on which pickup roll 421 is fixed. Also fixed on shaft 422 is a ratchet 439 adapted to cooperate with a pawl 440 carried by the bell crank 438 and urged into engagement with the teeth of the ratchet by a spring 441 fastened to an extension of the pawl and to a stud 442 carried by the bell crank. The cradle 430 is pivoted about shaft 419 during each cycle of the recording cylinder 300 in a manner to be described, and it will be seen that, during each such pivotal movement of the cradle, bell crank 438 will be rocked clockwise about shaft 422 carrying with it pawl 440 which steps the ratchet 439 one rotational increment thereby imparting the same incremental movement to the pickup roll 421.

During this rocking movement of the cradle 430 about shaft 419, distributor roll 423 carried by the cradle is lowered into light contact with pickup roll 421. This contact between the two rolls is not sufficient to transmit the continuous rotary movement of roll 423 to roll 421, but is sufficient only to transfer the ink on the surface of roll 421 to roll 423. This contact between the two rolls can be adjusted in a manner to be described for this purpose.

The rocking of cradle 430 about shaft 419 also oscillates an arm 443 extending into the ink reservoir I for substantially the full width of the ink fountain, arm 443 being fastened to distributor roll shaft 427 by a pair of end brackets 444 (Fig. 8) for this purpose. The composition of the fluorescent ink supply is frequently very viscous, and this rocking movement of arm 443 tends to agitate the ink and to assist in transferring a small amount of the ink to the pickup roll 421 as it is being stepped.

Means are provided to rock the cradle 430 during each rotational cycle of the rotary recording cylinder 300. For this purpose, a hub 445 is pinned to shaft 18 (Figs. 8 and 11), the hub having pivoted thereto one end of a link 446. The other end of link 446 is pivoted to one end of a rocker arm 447, the other end of which is fixed to a hub 448 of a rocker shaft 449 journaled through transverse plates 50, 51 of the casing 11 (Fig. 11). The rocker shaft 449 carries a pair of sleeves 451 pinned thereto, each sleeve having a pusher arm 452 in alignment with the two screws 432 threaded in the ears 431 of the cradle 430. It will thus be seen that, as the rotary member 300 is cycled, rocker arm 447 is pivoted by link 446 to rock shaft 449 carrying its pusher arms 452 into contact with the screws 432 of the ink fountain. This causes the cradle 430 to be pivoted about shaft 419 for each cycle of the rotary cylinder 300 thereby transferring the ink to distributor roll 423 from pickup roll 421 and indexing the latter roll one rotary increment, in the manner described above. Screws 432 are adjustable on ears 431 to adjust the magnitude of the pivotal movement of the cradle 430, and thereby the engagement of roll 423 with roll 421.

The apparatus also provides means for adjusting the inking roll 425 with respect to the rotary cylinder 300 and the recording elements 330 and 390 carried thereby. The inking roll 425 is fixed to a shaft 455 passing through elongated slots 456 in a pair of supporting members 457 connected by a cross bail 458 (Fig. 10). These supporting members 457 are pivotally mounted on shaft 419 and are adjustable by a pair of threaded studs 459 and locking nuts 460 disposed at the rear of the ink fountain. The studs pass through openings in cross rod 406 of the frame 401 and are threaded in the bail 458 of the inking roll support. Accordingly, by adjusting studs 459, the support for the inking roll 425 is pivoted about shaft 419 to adjust the position of the roll with respect to the rotary recording cylinder.

Means are also provided for raising the inking roll 425 from contact with distributor roll 424 where the apparatus is to stand idle for a long period of time. A pair of members 462 each having an operating lever 463 (Figs. 8 and 10) are pivoted on shaft 419 at each side of the fountain between the cradle 430 and the supporting members 457 for inking roll 425. Members 462 are each provided with a cam surface 462′ (Fig. 8) which bears on the extremities of shaft 455 of the inking roll passing through elongated slots 456 of the supporting members 457. Accordingly, as operating levers 463 are depressed, members 462 are rocked clockwise about shaft 419 thereby raising shaft 455 by cam surfaces 462′ and lifting the inking roll 425 out of contact with the distributor roll 424. The longer rear legs 405′ of the ink fountain frame 401 are each provided with a stud 465 (Fig. 8), to limit the upper position of levers 463, and with an opening 466 (Fig. 10) adapted to receive a stud 467 (Fig. 8) on each of the levers 463 to retain the latter in their lower limits.

The supporting members 457 for the inking roll 425 are also used to support distributor roll 426. The latter roll is loosely mounted on a shaft 470 having flattened ends disposed in slots in the supporting members 457, and is tensioned against the inking roll 425 by a spring 471 fastened to each end of shaft 470 and to studs 472 carried by the supporting members (Figs. 10 and 13).

The apparatus also provides means for reciprocating distributor roll 424 as it is being rotated in order to distribute the ink film evenly on the surface of the inking roll 425. The distributor roll 424 is reciprocated continuously while the apparatus is in use by the following mechanism illustrated in Figs. 11 and 12. A heart-shaped cam 475 is fixed to gear 19 to rotate continuously therewith and carries on its surface a pair of cam rollers 476 of a double-armed member 477. The latter member is pivotally supported by shaft 411 and carries with it a link 478 pivoted to one arm of a bell crank 479 supported by transverse plate 52. The opposite arm of the bell crank is hinged to a sleeve 480 fixed to drive shaft 416 to which is coupled, as described above, the driven shaft 419 of the ink fountain carrying the distributor roll 424. Accordingly, the distributor roll 424 will be reciprocated continuously to evenly distribute the ink film on the inking roll 425.

*Operation*

Briefly summarizing the foregoing, the described apparatus operates as follows:

The settable disks 331 are first set and locked in their differential positions with respect to the sheet gripping plate 385 to represent, e.g., the account number of a batch of checks, this being done in the manner described above. Also, the fixed recording elements 390 have presumably already been fixed in their differential positions with respect to the sheet gripping plate 385 to represent, e.g., the bank number and routing symbol applicable to that particular bank. With the above recording elements set to their data-representing positions, the electric motor switch (not shown) is turned on. This causes the check feeding belt 26 to be constantly driven while the apparatus is in use, and also causes the rolls 423—426 in the ink fountain to be continuously driven. However, the rotary recording cylinder 300 is in its idle position shown in Fig. 1 as its shaft 18 is not coupled by the power clutch mechanism to drive gear 19. Also, the pickup roll 421 in the ink fountain is idle, and the distributor roll 423 is in its non-transferring position with respect thereto, as shown diagrammatically in Fig. 12.

A plurality of checks, comprising a batch, are then each individually fed by the belt 26 between the frame 10 and casing 11 of the recording apparatus. As a check moves into position between the recording cylinder 300 and the platen 29, it raises roller 58 to engage lug 84 of the clutch mechanism with clutch member 85 and also to raise the stop element 224. The engagement of the clutch mechanism, in the manner described above, initiates a cycle of rotation of the rotary recording cylinder 300, and the raising of stop element 224 positions the leading edge of the check the required predetermined distance from the sheet gripping plate 385 of the cylinder when the check is first engaged thereby at the beginning of the recording action (Fig. 9).

As the rotary cylinder 300 begins to cycle (clockwise) the cradle 430 of the ink fountain 400 is rocked (clockwise) through the mechanism including elements 446—452 engaging the threaded studs 432 of the cradle. The rocking of the cradle lowers the distributor roll 423 into contact with the pickup roll 421 of the ink fountain to thereby transfer to the former roll a small amount of ink adhering to the surface of the latter roll. This rocking movement of the cradle also steps the pickup roll 421 one increment of rotation through the pawl and ratchet mechanism 439, 440, as described above, and also rocks the agitator blade 443 into the ink reservoir. The ink transferred to roll 423 is thoroughly and evenly distributed over the surface of inking roll 425, and as the recording cylinder 300 is rotated, a small amount of ink is transferred from the inking roll 425 to the recording elements 330 and 390.

The rotary cylinder 300 continues to cycle until its sheet gripping plate 385 contacts the check (as shown in Fig. 9), at which time it is at the required predetermined distance from the leading edge of the check as determined by the stop element 224. The recording cylinder makes rolling contact with the check, thereby transferring the ink coating on the recording elements as markings, or spots, thereon in their proper differential positions with respect to the leading edge of the check, at the same time moving the check reversely from its direction of feed by the belts 26. The reverse movement of the check is permitted by roller 233 having been raised through the action of cam 234 (Fig. 9).

As the recording cylinder 300 completes its cycle, the gripping plate 385 releases the check, roller 233 returns into contact with the check thus restoring the original direction of feed of the check by the belt, stop element 224 returns to its lower position permitting the check to be fed into the discharge receptacle (not shown), and the clutch disengages completing the cycle of rotation of the recording cylinder 300.

As the succeeding check is fed by the belt into recording position between the rotary cylinder 300 and the platen 29, it initiates another cycle of operation in the manner described above.

Figure 15:
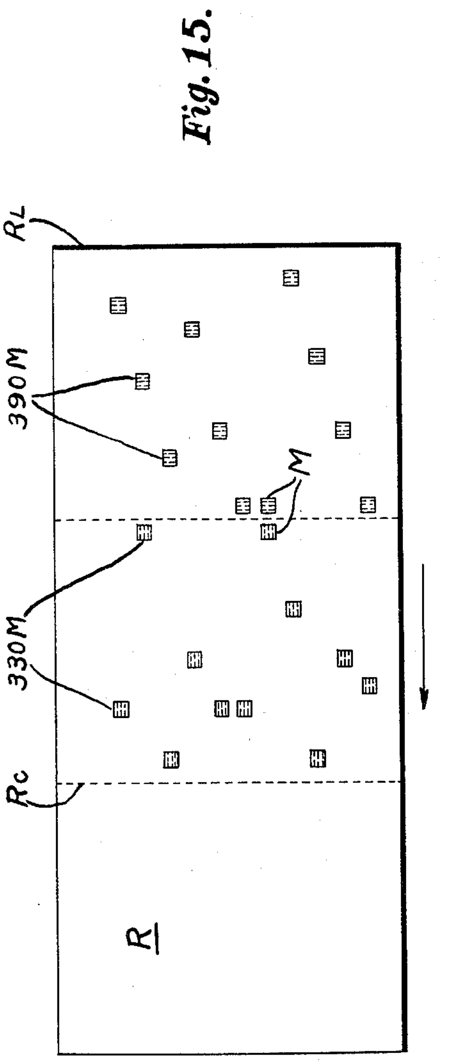
Fig. 15 illustrates a record sheet showing the fluorescent spots thereon in their coded positions corresponding to the differential positions of the recording elements of Fig. 14.

Fig. 15 illustrates a record sheet R having the fluorescent markings M impressed thereon in their differential positions corresponding to the positions of the settable and fixed recording elements, 330 and 390 respectively, of the recording cylinder 300 illustrated in Fig. 14. With the cylinder being driven clockwise (in the direction of the arrow of Fig. 14 as seen from the top of the cylinder), and the record sheet being moved thereby in the direction of the arrow of Fig. 15, it will be seen that the sheet gripping plate 385 will first engage the check on the dotted line $R_C$ (which will be the required predetermined distance from the leading edge $R_L$ of the check), and that the settable elements 330 will first apply their impressions 330M and then the fixed elements 390 will apply their impressions 390M as the check is moved in the direction of the arrow. The record impressions 390M applied by the fixed recording elements 390 will therefore be closest to the leading edge $R_L$ (serving as the reference on the record sheet) taken as the sheet is fed by the belts through the machine. Another dotted line in Fig. 15 separates the zone containing these record impressions 390M and the zone containing the record impressions 330M applied by the settable recording elements 330. These record impressions (and their respective recording elements) are, of course, identical to each other in form, differing only in position, and are distinguished by vertical and horizontal dotted lines in these figures merely for clarification purposes. The bare zone at the left of the record can be used to contain other coded information, such as the amount of the check in coded form.

The foregoing apparatus has been described as representing what is presently considered to be a preferred embodiment of the invention. However, it will be appreciated that the invention could be incorporated in other types of code recording apparatus, such as rotary perforating devices for coding information on record sheets, this being easily accomplished by the provision of a rotary apertured die synchronously driven with the rotary cylinder 300 in lieu of platen 29. Also, the invention is not restricted to coding with normally invisible fluorescent ink markings, since visible markings could also be applied to the record sheet. Further applications, variations, and modifications of the disclosed apparatus will be apparent to those skilled in the art coming within the spirit and scope of the invention as defined in the following claims.

We claim:

1. Code recording apparatus comprising a recording member mounted for rotation about an axis, a plurality of supporting members disposed within the recording member and in closely adjacent succession along the axis of said recording member, said supporting members being individually rotatably mounted about said axis as a center, each of said supporting members carrying a similarly configured recording element projecting from the circumferential surface of said recording member for recording the same impression on a record sheet, means for setting each of said rotatably mounted supporting members to position their respective recording elements at differential positions along the circumference of said recording member to represent data to be recorded, and means for driving said recording member through rotational recording cycles to record during each cycle differentially positioned impressions on a record sheet corresponding to the differentially set positions of the recording elements.

2. Code recording apparatus comprising a substantially cylindrical recording member mounted for rotation about an axis, a sheet gripping device fixed to the recording member and extending along a portion of the circumference of the recording member, a plurality of supporting members disposed within the recording member and in closely adjacent succession along the axis of said recording member, said supporting members being individually rotatably mounted about said axis as a center, each of said supporting members carrying a similarly configured recording element projecting from the circumferential surface of said cylindrical recording member for recording the same impression on a record sheet, means for setting each of said rotatably mounted supporting members to position their respective recording elements at differential positions along the circumference of said recording member occupied by said sheet gripping device to represent data to be recorded, means for locking said supporting members at their set position, and means for driving said recording member through rotational recording cycles to record during each cycle differentially positioned impressions on a record sheet corresponding to the differentially set positions of the recording elements.

3. Code recording apparatus comprising a recording cylinder including a shaft and a plurality of disks in closely adjacent succession along said shaft, said cylinder being mounted for rotation with said shaft as the axis, each of said disks being rotatably mounted on said shaft and each carrying a similarly configured recording element projecting from the circumferential surface of said recording cylinder for recording the same impression on a record sheet, means for setting each of said disks to position their respective recording elements at differential positions along the circumference of said recording cylinder to represent data to be recorded, each of said disks being formed with an opening, means disposed within said openings for selectively locking or unlocking said disks at their set positions, and means for driving said recording cylinder through rotational recording cycles to record during each cycle differentially positioned impressions on a record sheet corresponding to the differentially set positions of the recording elements.

4. Code recording apparatus comprising a recording cylinder including a shaft and a plurality of disks in closely adjacent succession along said shaft, said cylinder being mounted for rotation with said shaft as the axis, said disks being individually rotatably mounted on said shaft and each carrying a similarly configured recording element projecting from the circumfeerntial surface of said recording cylinder for recording the same impression on a record sheet, means for setting each of said disks to position their respective recording elements at differential positions along the circumference of said recording cylinder to represent data to be recorded, each of said disks being formed with an opening and having an indexing segment secured thereto adjacent said opening, pawl mechanism disposed within the disk openings and cooperable with the indexing segments for retaining said disks in their set positions, a bail extending through said disk openings, said bail being movable into locking or unlocking positions and cooperable with said pawl mechanism for selectively locking or unlocking said disks at their set positions, and means for driving said recording cylinder through rotational recording cycles to record during each cycle differentially positioned impressions on a record sheet corresponding to the differentially set positions of the recording elements.

5. Code recording apparatus as defined in claim 4 further including manipulatable means for manually moving said bail into locking or unlocking position and further means for automatically moving said bail into locking position during the eary part of a recording cycle.

6. Code recording apparatus as defined in claim 1 including means for continuously feeding record sheets into recording position with respect to said recording member, and means responsive to the movement of a record sheet into recording position for initiating a cycle of operation of said recording member.

7. Code recording apparatus as defined in claim 1 wherein said recording member further includes a plurality of similarly configured recording elements fixed along the circumferential surface of said recording member to represent further data to be recorded.

8. Code recording apparatus as defined in claim 1 wherein said similarly configured recording elements are printing elements and wherein said apparatus further includes means for inking said printing elements during rotational recording cycles of said recording member.

References Cited in the file of this patent

UNITED STATES PATENTS

| | | |
|---|---|---|
| 615,031 | Malmborg | Nov. 29, 1898 |
| 670,619 | Lister | Mar. 26, 1901 |
| 1,133,459 | Carrier | Mar. 30, 1915 |
| 1,180,331 | Stamatson | Apr. 25, 1916 |
| 1,208,642 | Pitney | Dec. 12, 1916 |
| 1,702,763 | Clark | Feb. 19, 1929 |
| 1,827,180 | Williams | Oct. 13, 1931 |
| 1,959,186 | Welter | May 15, 1934 |
| 1,991,511 | Lyman | Feb. 19, 1935 |
| 1,992,613 | Hartley | Feb. 26, 1935 |
| 1,996,607 | Barber | Apr. 2, 1935 |
| 2,005,038 | Kalman | June 18, 1935 |
| 2,022,136 | Payne | Nov. 26, 1935 |
| 2,069,656 | Kohler | Feb. 2, 1937 |
| 2,071,139 | Payne | Feb. 16, 1937 |
| 2,116,609 | Shomaker | May 10, 1938 |
| 2,189,027 | Fuller | Feb. 6, 1940 |
| 2,516,721 | Persson | July 25, 1950 |
| 2,566,955 | Oldenboom | Sept. 4, 1951 |
| 2,582,187 | Wolowitz | Jan. 8, 1952 |
| 2,660,950 | Lambert | Dec. 1, 1953 |
| 2,708,873 | Braun | May 24, 1955 |
| 2,743,671 | Weber | May 1, 1956 |
| 2,796,828 | Ritzerfeld et al. | June 25, 1957 |

FOREIGN PATENTS

| | | |
|---|---|---|
| 467,445 | Great Britain | June 17, 1937 |